(12) United States Patent
Polster et al.

(10) Patent No.: US 11,235,974 B2
(45) Date of Patent: Feb. 1, 2022

(54) PROCESS AND PLANT FOR PRODUCING SYNTHESIS GAS WITH VARIABLE COMPOSITION

(71) Applicant: L'Air Liquide, Societe Anonyme pour l'Etude et l'Exploitation des Procedes Georges Claude, Paris (FR)

(72) Inventors: Bernd Polster, Joinville-le-Pont (FR); Antoine Hernandez, La Queue en Brie (FR)

(73) Assignee: L'Air Liquide, Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 278 days.

(21) Appl. No.: 15/764,489

(22) PCT Filed: Sep. 23, 2016

(86) PCT No.: PCT/EP2016/025102
§ 371 (c)(1),
(2) Date: Mar. 29, 2018

(87) PCT Pub. No.: WO2017/054932
PCT Pub. Date: Apr. 6, 2017

(65) Prior Publication Data
US 2018/0282159 A1 Oct. 4, 2018

(30) Foreign Application Priority Data

Oct. 1, 2015 (EP) ..................................... 15400041

(51) Int. Cl.
*C01B 3/38* (2006.01)
*C01B 3/48* (2006.01)
(Continued)

(52) U.S. Cl.
CPC ................ *C01B 3/384* (2013.01); *C01B 3/48* (2013.01); *C01B 32/40* (2017.08); *F25J 3/0223* (2013.01);
(Continued)

(58) Field of Classification Search
CPC .. C01B 3/384; C01B 32/40; C01B 3/48; F25J 3/0223; F25J 3/0233; F25J 3/0261; Y02P 20/128
See application file for complete search history.

(56) References Cited

U.S. PATENT DOCUMENTS 5,538,706 A * 7/1996 Kapoor ..................... C01B 3/36
252/373
6,599,491 B2 * 7/2003 Vidalin ................... C01B 3/025
422/608
(Continued)

FOREIGN PATENT DOCUMENTS

EP 0790212 A1 * 8/1997 ............. F25J 3/0223
EP 1 818 310 8/2007

OTHER PUBLICATIONS

International Search Report and Written Opinion for PCT/EP2016/025102, dated Dec. 6, 2016.
(Continued)

*Primary Examiner* — Richard M Rump
(74) *Attorney, Agent, or Firm* — Justin K. Murray

(57) ABSTRACT

A process and a plant for the continuous conversion of a hydrocarbonaceous feed gas into a synthesis gas comprising carbon monoxide and hydrogen, wherein the $H_2/CO$ molar ratio of the product gases can be varied within a wide range. This is achieved in that at least a part of a methane-rich gas obtained during the fractionation of the raw synthesis gas is admixed to the feed gas mixture, and that in the alternative at least a part of the $H_2$ product gas and/or a fraction of a hydrogen-rich gas increased with respect to the normal
(Continued)

operation of the process is admixed to the heating gas mixture, in order to lower the $H_2/CO$ ratio, or at least a part of the CO product gas and/or a fraction of a carbon monoxide-rich gas increased with respect to the normal operation of the process is admixed to the heating gas mixture, in order to increase the $H_2/CO$ ratio.

1 Claim, 2 Drawing Sheets

(51) Int. Cl.
*C01B 32/40* (2017.01)
*F25J 3/02* (2006.01)
(52) U.S. Cl.
CPC ........... *F25J 3/0233* (2013.01); *F25J 3/0252* (2013.01); *F25J 3/0261* (2013.01); *C01B 2203/0233* (2013.01); *C01B 2203/0238* (2013.01); *C01B 2203/0283* (2013.01); *C01B 2203/043* (2013.01); *C01B 2203/046* (2013.01); *C01B 2203/047* (2013.01); *C01B 2203/048* (2013.01); *C01B 2203/0415* (2013.01); *C01B 2203/0475* (2013.01); *C01B 2203/0822* (2013.01); *C01B 2203/0827* (2013.01); *C01B 2203/147* (2013.01); *C01B 2203/148* (2013.01); *Y02P 20/10* (2015.11)

(56) References Cited

U.S. PATENT DOCUMENTS

| | | | |
|---|---|---|---|
| 8,460,633 B2* | 6/2013 | Casanave | ................. C01B 3/323 |
| | | | 423/648.1 |
| 8,888,873 B2 | 11/2014 | Haik-Beraud et al. | |
| 2007/0051042 A1 | 3/2007 | Grover et al. | |
| 2007/0245630 A1* | 10/2007 | Klein | ...................... C01B 3/506 |
| | | | 48/198.3 |
| 2010/0310949 A1 | 12/2010 | Licht et al. | |
| 2014/0070144 A1* | 3/2014 | Chalabi | ..................... C01B 3/18 |
| | | | 252/373 |
| 2014/0186258 A1* | 7/2014 | Allidieres | ................. C01B 3/26 |
| | | | 423/650 |

OTHER PUBLICATIONS

Heinz-Wolfgang Haring, "Hydrogen and Carbon Monoxide : Synthesis Gases," Industrial Gases Processing, (Oct. 5, 2008), Wiley-VCH Verlag, XP055016578, ISBN: 978-3-52-731685-4, pp. 145-146, fig 5.3.

* cited by examiner

PROCESS AND PLANT FOR PRODUCING SYNTHESIS GAS WITH VARIABLE COMPOSITION

CROSS REFERENCE TO RELATED APPLICATIONS

This application is a § 371 of International PCT Application PCT/EP2016/025102, filed Sep. 23, 2016, which claims the benefit of EP15400041.8, filed Oct. 1, 2015, both of which are herein incorporated by reference in their entireties.

FIELD OF THE INVENTION

This invention relates to a process and a plant for the continuous conversion of a hydrocarbonaceous feed gas into a synthesis gas comprising carbon monoxide and hydrogen. In particular, this invention relates to a process and a plant for the continuous production of synthesis gases with variable molar ratio of hydrogen to carbon monoxide.

Background of the Invention

Processes and plants as described above are known from the prior art and described e.g. in the American patent specification U.S. Pat. No. 8,888,873 B2.

The molar ratio of hydrogen to carbon monoxide ($H_2$/CO ratio, mol/mol) of a synthesis gas produced by means of such process or in such plant substantially is determined by the following chemical equilibrium reactions:

$$CH_4 + H_2O = CO + 3H_2$$

$$CO + H_2O = CO_2 + H_2$$

The height of the $H_2$/CO ratio in the synthesis gas is determined by the height of the molar ratio between carbon and steam in the feed gas, by the efficiency of the reforming catalyst, and by the height of the pressures and temperatures existing during the reforming reactions. Another known possibility for setting the $H_2$/CO molar ratio consists in setting the carbon dioxide content in the feed gas, as it is likewise taught in the patent specification U.S. Pat. No. 8,888,873 B2. However, setting or varying the $H_2$/CO ratio only is possible within relatively narrow limits. At the same time there is a need to produce synthesis gases with very different $H_2$/CO ratios preferably with the same production plant, in order to satisfy the needs of various downstream processes within integrated production networks.

It therefore is the object of the invention to provide a process and a plant which provides for setting the $H_2$/CO molar ratio within wider limits than is known so far from the prior art.

SUMMARY OF THE INVENTION

This object is solved by a process and by a plant according to the various embodiments as described herein.

Process According to an Embodiment of the Invention

A process for the continuous conversion of a hydrocarbonaceous feed gas into a synthesis gas comprising carbon monoxide and hydrogen, comprising the following process steps carried out one after the other:

a) providing a feed gas mixture which comprises hydrocarbonaceous gas and steam, as well as a heating gas mixture which comprises a fuel gas and a gas rich in oxygen,
b) splitting the feed gas mixture under reforming conditions by catalytic steam reformation in a tubular reformer fired by burners into a raw synthesis gas containing hydrogen, carbon monoxide, carbon dioxide and methane, wherein the heat necessary for splitting, which is indirectly transmitted to the feed gas mixture, is produced by combustion of the heating gas mixture, wherein in normal operation of the process a base $H_2$/CO ratio VB is obtained,
c) separating the carbon dioxide from the raw synthesis gas,
d) fractionating the raw synthesis gas into a gas rich in hydrogen, a gas rich in carbon monoxide and a gas rich in methane, wherein the gas rich in hydrogen optionally is supplied to a further cleaning step and otherwise is discharged from the process as $H_2$ product gas, and the gas rich in carbon monoxide is supplied to the further use outside the process as CO product gas,
e) optionally cleaning of the gas rich in hydrogen by separating gaseous impurities and admixing the same to the heating gas mixture and discharging the cleaned gas rich in hydrogen as $H_2$ product gas for the further use outside the process,
wherein
f) at least a part of the gas rich in methane obtained according to step d) is admixed to the feed gas mixture, and that
g) at least a part of the $H_2$ product gas and/or a fraction of the gas rich in hydrogen increased with respect to the normal operation of the process is admixed to the heating gas mixture, so that the $H_2$/CO ratio V1 is lowered with respect to the base $H_2$/CO ratio VB to a target value V1<VB.

Process According to an Embodiment of the Invention in an Alternative Configuration A process for the continuous conversion of a hydrocarbonaceous feed gas into a synthesis gas comprising carbon monoxide and hydrogen, comprising the following process steps carried out one after the other:

a) providing a feed gas mixture which comprises hydrocarbonaceous gas and steam, as well as a heating gas mixture which comprises a fuel gas and a gas rich in oxygen,
b) splitting the feed gas mixture under reforming conditions by catalytic steam reformation in a tubular reformer fired by burners into a raw synthesis gas containing hydrogen, carbon monoxide, carbon dioxide and methane, wherein the heat necessary for splitting, which is indirectly transmitted to the feed gas mixture, is produced by combustion of the heating gas mixture, wherein in normal operation of the process a base $H_2$/CO ratio VB is obtained,
c) separating the carbon dioxide from the raw synthesis gas,
d) fractionating the raw synthesis gas into a gas rich in hydrogen, a gas rich in carbon monoxide and a gas rich in methane, wherein the gas rich in hydrogen optionally is supplied to a further cleaning step and otherwise is discharged from the process as $H_2$ product gas, and the gas rich in carbon monoxide is supplied to the further use outside the process as CO product gas,
e) optionally cleaning of the gas rich in hydrogen by separating gaseous impurities and admixing the same to the heating gas mixture and discharging the cleaned gas rich in hydrogen as $H_2$ product gas for the further use outside the process,
wherein f) at least a part of the gas rich in methane obtained according to step d) is admixed to the feed gas mixture, and that g) at least a part of the CO product gas and/or a fraction of the gas rich in carbon monoxide increased with respect to the normal operation of the process is admixed to the heating gas mixture, so that the $H_2/CO$ ratio V1 is increased with respect to the base $H_2/CO$ ratio VB to a target value V1>VB.

Plant According to an Embodiment of the Invention

A plant for the continuous conversion of a hydrocarbonaceous feed gas into a synthesis gas comprising carbon monoxide and hydrogen, comprising the following means and plant sections:
a) means for supplying a feed gas mixture which comprises hydrocarbonaceous gas and steam, as well as a heating gas mixture which comprises a fuel gas and a gas rich in oxygen, from external sources to the plant, as well as means for the transfer of the gas or gases between the plant sections and out of the plant for their further use,
b) plant section for the steam reformation of the feed gas mixture to a raw synthesis gas, with a tubular reformer fired by burners, comprising:
a housing,
catalyst tubes which are arranged in the housing and are filled with a catalyst bed and through which the feed gas mixture is passed and is reformed into raw synthesis gas containing hydrogen, carbon monoxide, carbon dioxide and methane,
burners which are operated with the heating gas mixture and which are installed in the housing such that their flames reach into the housing and thereby produce the heat necessary for the reformation and transmit the same to the catalyst tubes and hence indirectly to the feed gas mixture,
c) plant section for separating the carbon dioxide from the raw synthesis gas,
d) plant section for fractionating the raw synthesis gas into a gas rich in hydrogen, which is supplied either to the treatment in step e) or to the further use outside the plant, furthermore into a gas rich in carbon monoxide which is supplied to the further use outside the plant, and into a gas rich in methane which is admixed to the feed gas mixture and/or to the heating gas mixture,
e) optionally a plant section for cleaning of the gas rich in hydrogen by separating gaseous impurities, means for admixing the same to the heating gas mixture, and means for discharging the cleaned gas rich in hydrogen as $H_2$ product gas for the further use outside the process,
wherein
f) means for admixing at least a part of the gas rich in methane obtained in plant section d) to the feed gas mixture, and
g) means for admixing at least a part of the $H_2$ product gas and/or the gas rich in hydrogen to the heating gas mixture or means for admixing at least a part of the CO product gas to the heating gas mixture,
h) means for controlling the mass flows of the gases to be admixed to the feed gas mixture and to the heating gas mixture.

Normal operation is understood to be a mode of operation of the reformer plant known from the prior art, in which neither gas rich in methane is recirculated to the feed gas mixture nor $H_2$ product gas, gas rich in hydrogen or CO product gas is recirculated to the heating gas mixture.

Reforming conditions are understood to be the operating conditions of the reformer plant well known to the skilled person, which ensure a technically and economically expedient degree of conversion of the feedstocks to synthesis gas components. A set of operating conditions chosen therefor also is referred to as operating point.

In one aspect of the invention at least a part of the gas rich in methane obtained according to step d) is admixed to the feed gas mixture. In an alternative aspect either at least a part of the $H_2$ product gas and/or a fraction of the gas rich in hydrogen increased with respect to the normal operation of the process can be admixed to the heating gas mixture, so that the $H_2/CO$ ratio V1 is lowered with respect to the base $H_2/CO$ ratio VB to a target value V1<VB, or alternatively at least a part of the CO product gas and/or a fraction of the gas rich in carbon monoxide increased with respect to the normal operation of the process can be admixed to the heating gas mixture, so that the $H_2/CO$ ratio V1 is increased with respect to the base $H_2/CO$ ratio VB to a target value V1>VB.

It here is important that the fraction of gas rich in methane, which according to the invention as compared to the normal operation of the process is not admixed to the heating gas mixture, but to the feed gas mixture, is replaced by calorically equivalent fractions of $H_2$ product gas, gas rich in hydrogen or CO product gas, i.e. fractions equivalent with regard to their calorific value, in order to ensure a stable operation of the reformer plant.

DETAILED DESCRIPTION OF THE INVENTION

In a preferred aspect of the invention, the fraction of gas rich in methane, which is admixed to the feed gas mixture, is at least 50%, preferably at least 70%, most preferably at least 90% of the gas rich in methane obtained according to step d).

It furthermore is favorable when at least 20%, preferably at least 30%, most preferably at least 40% of the $H_2$ product gas or the gas rich in hydrogen are admixed to the heating gas mixture or, in an alternative aspect, at least 20%, preferably at least 30%, most preferably at least 40% of the CO product gas are admixed to the heating gas mixture.

It has been found that within the aforementioned ranges taking account of the caloric equivalence of the gas streams admixed to the feed gas mixture and to the heating gas mixture the $H_2/CO$ ratio can be set within wide limits, while at the same time a stable and trouble-free operation of the reformer plant becomes possible with a proper heat balance.

In another preferred aspect of the invention, the process is carried out with the following temporally successive steps:

Step 1: The $H_2$ product gas or the gas rich in hydrogen or the CO product gas is completely admixed to the heating gas mixture.

Step 2: The $H_2$ product gas or the gas rich in hydrogen or the CO product gas for one part is admixed to the heating gas mixture and for the other part is discharged for the further use outside the process, wherein the discharged fraction is increased or reduced continuously or step by step, until the target value V1 of the $H_2/CO$ ratio is achieved.

This procedure provides for realizing the change of the quantity of CO and/or $H_2$ delivered to the external consumer more quickly than is possible in a conventional way.

Preferably, the carbon dioxide separated from the raw synthesis gas is admixed to the feed gas mixture at least in part. In this way, the separated carbon dioxide can be utilized materially at least in part. Furthermore, it thus is possible to further influence the $H_2/CO$ ratio.

The $H_2/CO$ ratio can be influenced to an even greater extent by admixing carbon dioxide produced outside the process to the feed gas mixture. Advantageously, a sink for carbon dioxide present in excess or undesired, foreign to the process thus is created at the same time.

In a preferred aspect of the process according to the invention the separation of the raw synthesis gas into a gas rich in hydrogen, a gas rich in carbon monoxide and a gas rich in methane is carried out by means of a cryogenic distillation process, wherein a further gas stream containing combustible gas components (coldbox flashgas) is obtained, which is at least partly admixed to the heating gas mixture and/or the feed gas mixture. This provides for the thermal and/or material utilization of the coldbox flashgas. This procedure and such plants are proven in practical operation and in the current language are referred to as Coldbox (CB).

When carrying out the process according to the invention it furthermore is preferred that cleaning of the gas rich in hydrogen is carried out by separation of gaseous impurities by means of a pressure swing adsorption process (PSA), wherein the gaseous impurities are obtained as separate gas stream (PSA offgas) and are at least partly admixed to the heating gas mixture. This provides for the thermal utilization of the PSA offgas.

In another preferred aspect of the invention, separating the carbon dioxide from the raw synthesis gas by means of an absorption process, carried out in a corresponding absorption plant, is effected by using e.g. methyldiethanolamine (MDEA) as absorbent. This process or such plant is described e.g. in Ullmann's Encyclopedia of Industrial Chemistry, Sixth Edition, Vol. 15, page 410. These are long-established processes or plants. It is advantageous that the carbon dioxide can efficiently be separated from the raw synthesis gas and can be used further, for example for the recirculation to the feed gas mixture.

In a preferred aspect of the plant according to the invention the same also comprises means for the recirculation of the carbon dioxide separated from the raw synthesis gas to the feed gas mixture and/or means for supplying carbon dioxide produced outside the process to the feed gas mixture.

In a further preferred aspect of the plant according to the invention the plant section for separating the raw synthesis gas into a gas rich in hydrogen, a gas rich in carbon monoxide and a gas rich in methane is designed as cryogenic distillation process, wherein there are furthermore comprised means for discharging a further gas stream containing combustible gas components (coldbox flashgas).

In a further preferred aspect of the plant according to the invention the plant section for cleaning the gas rich in hydrogen by separation of gaseous impurities is designed as pressure swing adsorption process (PSA), wherein there are furthermore comprised means for discharging a further gas stream containing gaseous impurities (PSA offgas) and for at least partly admixing the same to the heating gas mixture.

BRIEF DESCRIPTION OF THE DRAWINGS

Further features, advantages and possible applications of the invention can also be taken from the following description of exemplary embodiments and numerical examples as well as the drawings. All features described and/or illustrated form the subject-matter of the invention per se or in any combination, independent of their inclusion in the claims or their back-reference.

The invention will now be explained with reference to the drawings, in which.

DETAILED DESCRIPTION OF THE INVENTION

Figure 1:
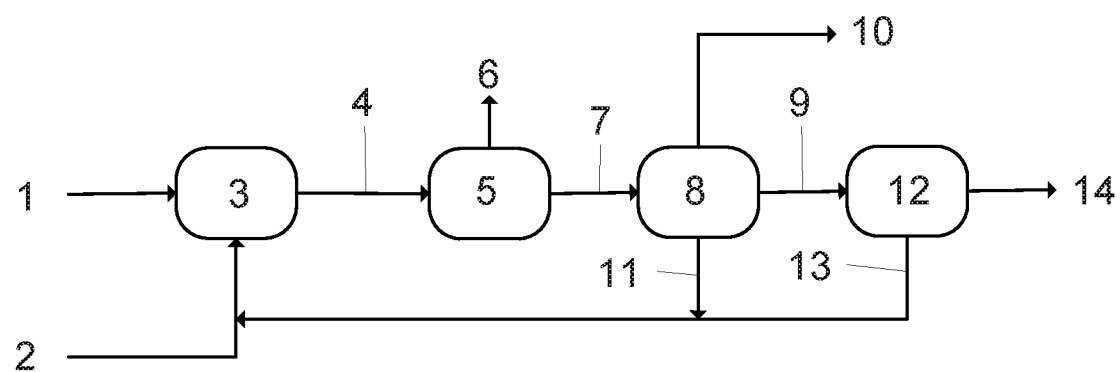
FIG. 1 shows a block diagram of a process according to the prior art.

FIG. 1, Comparative Example According to the Prior Art

The feed gas mixture 1, comprising hydrocarbonaceous gas and steam, as well as the heating gas mixture 2, comprising a fuel gas and a gas rich in oxygen, are charged to a reformer 3. In the reformer 3 the feed gas mixture 1 is converted into a raw synthesis gas 4, comprising hydrogen, carbon monoxide, carbon dioxide and methane as well as water, possibly nitrogen and impurities known to the skilled person. The raw synthesis gas 4 is transferred from the reformer 3 into a plant 5 for separating the carbon dioxide 6 from the raw synthesis gas 4. This separation in plant 5 can be effected for example by means of an absorption process by using methyldiethanolamine (MDEA). The separated carbon dioxide 6 is discharged from the plant 5 and supplied to a further use or discharged into the environment. The raw synthesis gas 7 liberated from carbon dioxide is passed from plant 5 into a plant 8 for fractionating the raw synthesis gas into a gas 9 rich in hydrogen, a gas 10 rich in carbon monoxide, and a gas 11 rich in methane. This fractionation in plant 8 can be effected for example by means of a cryogenic distillation process. In this example, the gas 11 rich in methane is added to the heating gas mixture 2. The gas 10 rich in carbon monoxide is discharged for the further use as product gas and the gas 9 rich in hydrogen in this example is supplied to a plant 12 for the separation of gaseous impurities. For carrying out this separation a pressure swing adsorption process can be employed. The gaseous impurities separated in this process are admixed to the heating gas mixture 2. The cleaned gas 14 rich in hydrogen is discharged from the plant for the further use as $H_2$ product gas.

When using a cryogenic distillation plant for the separation of the raw synthesis gas 7 liberated from carbon dioxides, a high purity of the gas 9 rich in hydrogen is achieved already, which typically lies in the range from 95% to 99%, based on the molar fraction of hydrogen. Depending on the required purity of the $H_2$ product stream a further purification of this stream normally is necessary, in order to achieve a hydrogen purity in the range from 99.9% to 99.999%, based on the molar fraction of hydrogen. In rare cases, this purification is not necessary.

Figure 2:
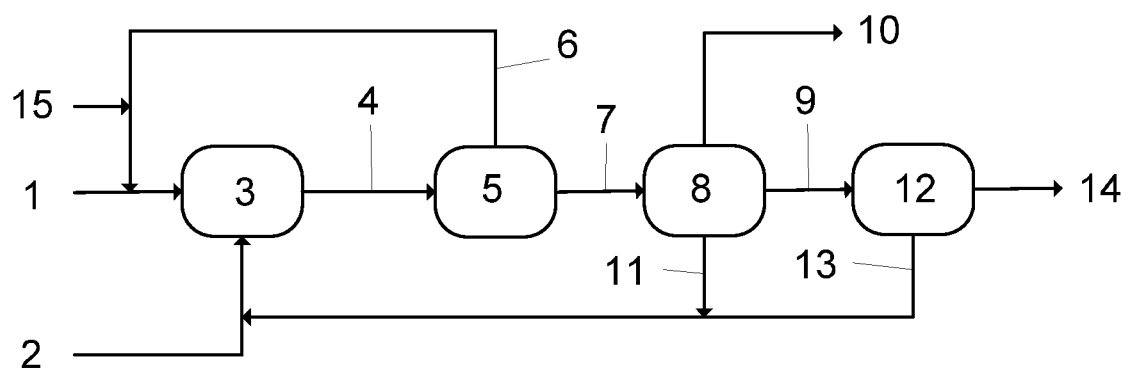
FIG. 2 shows a block diagram of an alternative process according to the prior art with carbon dioxide recirculation and supply of external carbon dioxide.

FIG. 2, Comparative Example According to the Prior Art

In this example, the carbon dioxide 6 separated from the raw synthesis gas 7 in plant 5 by means of an absorption process is added to the feed gases 1, in addition with externally obtained carbon dioxide 15.

Figure 3:
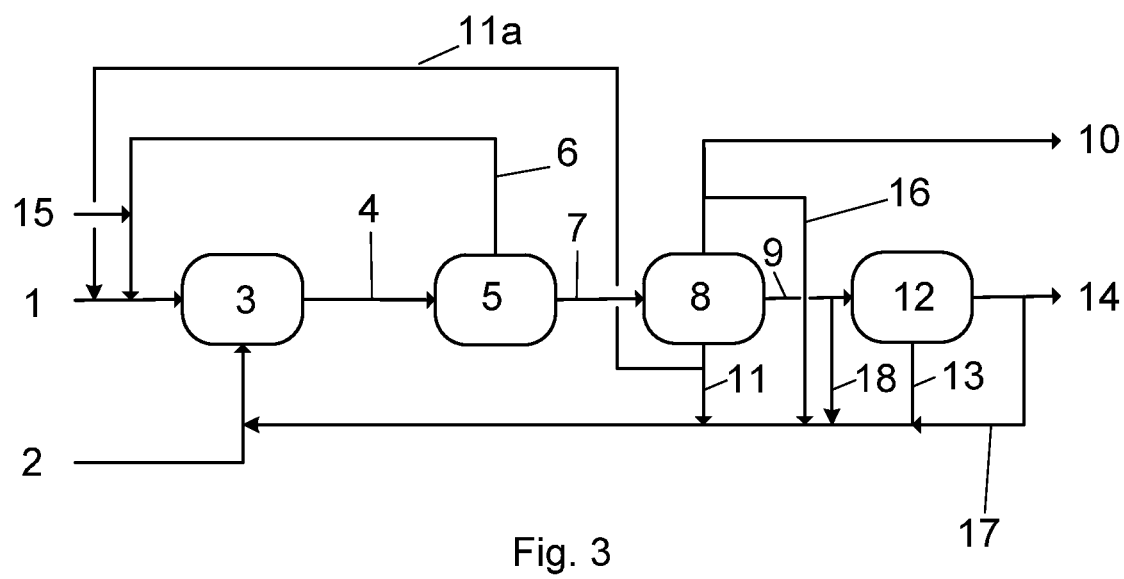
FIG. 3 shows a block diagram of a first exemplary aspect of the invention, based on FIG. 2.

FIG. 3, Exemplary Embodiment of the Invention

This example shows a plant according to FIG. 2, in which a part of the product gas 16 rich in carbon monoxide and/or of the gas 18 rich in hydrogen or of the $H_2$ product gas 17 is recirculated in addition and admixed to the heating gas mixture 2. Furthermore, a part of the gas 11a rich in methane is recirculated from the cryogenic distillation plant (coldbox) 8 into the feed gas mixture. The remaining fraction of gas 11 rich in methane is admixed to the heating gas mixture.

Since the gas stream 18 rich in hydrogen provided from the cryogenic distillation plant already has a very high hydrogen content, the same can also be admixed to the heating gas mixture in accordance with the invention, in order to lower the $H_2/CO$ ratio. Hence, it is not absolutely necessary to admix a partial stream of the purified $H_2$ product stream to the heating gas mixture.

Figure 4:
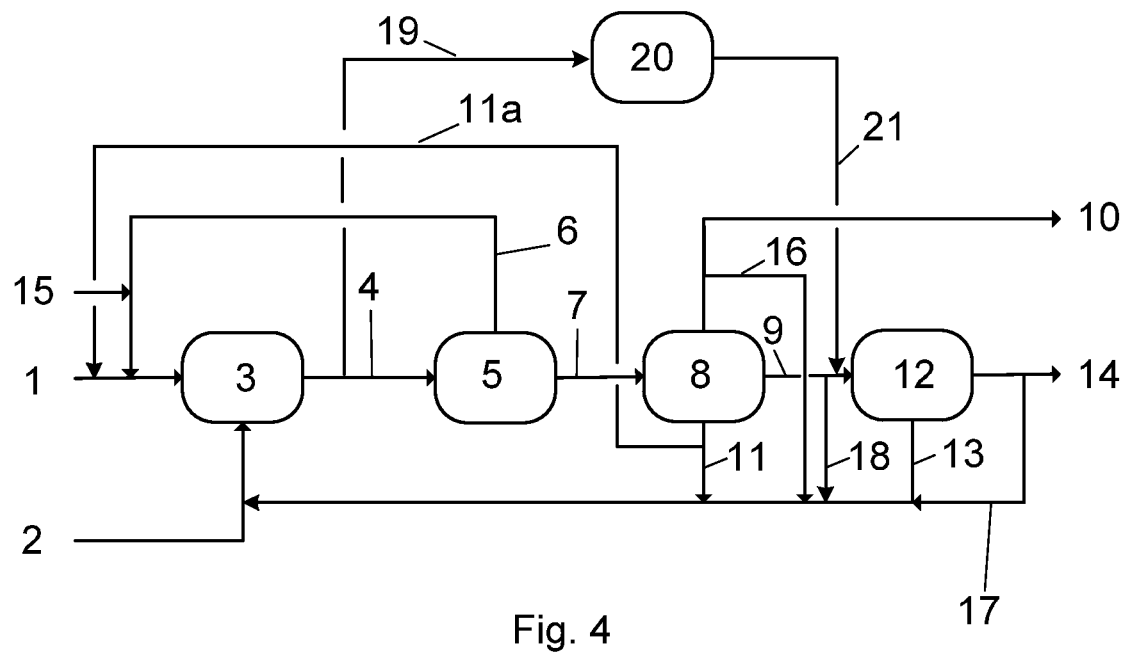
FIG. 4 shows a block diagram of a second exemplary aspect of the invention, based on FIG. 3, with additional CO shift stage.

FIG. 4, Exemplary Embodiment of the Invention

This example shows a plant according to FIG. 3, but without the recirculation of $CO_2$ separated from the raw synthesis gas or imported from external sources. Furthermore, this example contains a CO shift stage 20 which is charged with a partial stream of the raw synthesis gas 19 and from which a gas stream 21 enriched in hydrogen is discharged and together with the gas stream 9 rich in hydrogen from plant 8 is supplied to the pressure swing adsorption plant 12.

Numerical Examples of the Prior Art (Comparative Examples), Tables 1 to 3

A possibility known to the skilled person for setting the $H_2/CO$ molar ratio consists in setting the carbon dioxide content in the feed gas, as it is illustrated in the following Tables 1 to 3.

Without addition of carbon dioxide into the feed gas the $H_2/CO$ molar ratio in the synthesis gas can be set in the range from 3.8 to 5.4 or as ratio of the $H_2$ and CO product streams in the range from 3.3 to 4.7 by selection of the operating conditions (see Table 1). Operating conditions which influence the $H_2/CO$ molar ratio above all include the reformer temperature and the ratio of steam to carbon (S/C ratio) in the feed gas and to a smaller extent also the reformer pressure and the efficiencies of the CO and $H_2$ purification devices.

TABLE 1

Comparison of the $H_2/CO$ ratios for the product and synthesis gas streams for various operating conditions (reformer temperature, S/C ratio) at a reformer pressure of 25 bara, for a feed of 100% $CH_4$, with a CO and $H_2$ efficiency of 97% for the cryogenic distillation plant and a $H_2$ efficiency of 87% for the pressure swing adsorption process

| | Case | | | | | | | | |
|---|---|---|---|---|---|---|---|---|---|
| | A | B | C | D | E | F | G | H | I |
| S/C ratio | 2.5 | 2.5 | 2.0 | 2.0 | 2.0 | 2.0 | 1.8 | 1.8 | 1.6 |
| Reformer temperature (° C.) | 850 | 880 | 850 | 880 | 900 | 920 | 920 | 940 | 940 |
| CO product stream ($Nm^3/h$) | 10000 | 10000 | 10000 | 10000 | 10000 | 10000 | 10000 | 10000 | 10000 |
| $H_2$ product stream ($Nm^3/h$) | 46250 | 42475 | 42920 | 39450 | 37670 | 36250 | 35150 | 34030 | 33000 |
| $CH_4$ feed stream ($Nm^3/h$) | 23100 | 19670 | 23920 | 20180 | 18320 | 16850 | 17070 | 15840 | 16115 |
| $H_2/CO$ in the synthesis gas | 5.37 | 4.94 | 5.01 | 4.60 | 4.39 | 4.22 | 4.09 | 3.96 | 3.84 |
| $CO_2$ content in the synthesis gas ($Nm^3/h$) | 5980 | 4860 | 5000 | 3960 | 3440 | 3010 | 2690 | 2360 | 2050 |
| $CH_4$ content in the synthesis gas ($Nm^3/h$) | 6815 | 4500 | 8630 | 5910 | 4580 | 3530 | 4070 | 3170 | 3750 |

With partial to complete recirculation of the carbon dioxide separated from the synthesis gas into the feed gas ratios of 2.6 to 3.3 can be set, based on the product streams (see Table 2), or of 3.8 to 3.0 in the synthesis gas. The ratio can be lowered to the range of 1.4 to 2.6, based on the product streams (see Table 3), or of 1.6 to 3.0 in the synthesis gas, when in addition to the complete carbon dioxide recirculation carbon dioxide originating from an external source is admixed to the feed gas, wherein the quantity of the carbon dioxide admixed to the feed gas, originating from an external source, decisively influences the ratio.

TABLE 2

Comparison of the $H_2/CO$ ratios for the product and synthesis gas streams for the same operating conditions as for Table 1 (derived cases A, D, F, H) and with an additional $CO_2$ admixture of 95% of the carbon dioxide separated from the raw synthesis gas to the feed gas mixture

| Case | A-2 | D-2 | F-2 | H-2 |
|---|---|---|---|---|
| S/C ratio | 2.5 | 2.0 | 2.0 | 1.8 |
| Reformer temperature (° C.) | 850 | 880 | 920 | 940 |
| CO product stream ($Nm^3/h$) | 10000 | 10000 | 10000 | 10000 |
| $H_2$ product stream ($Nm^3/h$) | 27380 | 26920 | 26715 | 26570 |

TABLE 2-continued

Comparison of the H$_2$/CO ratios for the product and synthesis gas streams for the same operating conditions as for Table 1 (derived cases A, D, F, H) and with an additional CO$_2$ admixture of 95% of the carbon dioxide separated from the raw synthesis gas to the feed gas mixture

| Case | A-2 | D-2 | F-2 | H-2 |
|---|---|---|---|---|
| CH$_4$ feed stream (Nm$^3$/h) | 14670 | 14405 | 12910 | 12735 |
| H$_2$/CO in the synthesis gas | 3.19 | 3.14 | 3.11 | 3.09 |
| CO$_2$ content in the synthesis gas (Nm$^3$/h) | 7280 | 4740 | 3570 | 2760 |
| CH$_4$ content in the synthesis gas (Nm$^3$/h) | 3990 | 3860 | 2420 | 2290 |

TABLE 3

Comparison of the H$_2$/CO ratios for the product and synthesis gas streams for the same operating conditions as for Tables 1 and 2 (derived case F-2 from Table 2) with additional admixture of CO$_2$ originating from an external source to the feed gas mixture

| Case | F-2 | F-2-I | F-2-II | F-2-III |
|---|---|---|---|---|
| Externally obtained CO$_2$ to the feed gas (Nm$^3$/h) | 0 | 1000 | 2000 | 4000 |
| S/C ratio | 2.0 | 2.0 | 2.0 | 2.0 |
| Reformer temperature (° C.) | 920 | 920 | 920 | 920 |
| CO product stream (Nm$^3$/h) | 10000 | 10000 | 10000 | 10000 |
| H$_2$ product stream (Nm$^3$/h) | 26715 | 23460 | 20205 | 13805 |
| CH$_4$ feed stream (Nm$^3$/h) | 12910 | 11550 | 10175 | 7490 |
| H$_2$/CO in the synthesis gas | 3.11 | 2.73 | 2.35 | 1.61 |
| CO$_2$ content in the synthesis gas (Nm$^3$/h) | 3570 | 3850 | 4230 | 5470 |
| CH$_4$ content in the synthesis gas (Nm$^3$/h) | 2420 | 2030 | 1620 | 840 |

Plants for the production of CO and H$_2$ are designed such that a specified H$_2$/CO molar ratio of the H$_2$ and CO product streams is achieved in that the operating conditions are adapted and for example a partial or complete recirculation of the carbon dioxide separated from the synthesis gas is carried out. When the H$_2$/CO molar ratio achieved is too high even with complete recirculation of CO$_2$, an admixture of externally obtained CO$_2$ to the feed gas mixture can be taken into consideration. A recirculation of the carbon dioxide separated from the synthesis gas also can possibly be omitted, when externally obtained CO$_2$ e.g. is present already in a sufficient quantity at feed pressure. The external carbon dioxide should be present in sufficient purity, wherein impurities with carbon, nitrogen and hydrogen compounds possibly are acceptable, and should not contain any compounds which are harmful for the catalysts of the steam reformation plant (such as e.g. arsenic, sulfur, chlorine, metals).

To keep the plant costs low, only small adaptations of the feed parameters chosen for the plant design can be made during operation of the plant, which then also allow only small changes of the H$_2$/CO product ratio as compared to the original design. Deviations of maximally 10% of the H$_2$/CO molar ratio then are possible. In the real plant operation, however, load cases sometimes occur, in which the H$_2$/CO product ratio differs distinctly from the possible changes. Since the fluctuations of such H$_2$/CO product ratios in part are very large, but normally only last for a short time, these cases normally are not taken into account in the plant design and covered by flaring of the excess product stream, which can lead to high costs for extended periods.

Setting H$_2$/CO molar ratios outside these ranges would lead to an uneconomic design of individual plant components or a plant design intended for normal operation is limited with regard to the temperature levels to be set by the loadability of the construction materials of the plant components, or over-dimensioning of plant components would have to be effected, whose economy is not given in normal operation.

Possibly, additional plant components also would have to be used; for example, a partial stream of the raw synthesis gas might be supplied to a CO shift stage, in order to increase the H$_2$/CO ratio or provide a plant with a high flexibility with regard to the H$_2$/CO ratio.

The H$_2$/CO ratio of the products as specified during the plant design substantially is constant at various load conditions of the plant. A plant for the production of H$_2$ and CO normally can be run down to a plant load of approximately 20% to 40% of the design load. In operation of a plant under partial load a higher flexibility of the H$_2$/CO product ratio is given. At a plant load of approximately 50% deviations of about 20% of the H$_2$/CO molar ratio are possible.

Numerical Examples of the Invention, Tables 4 to 7

One aspect of the invention is characterized in that at least a part of the gas rich in methane obtained is admixed to the feed gas mixture. By this measure the consumption of external hydrocarbonaceous feed gas is reduced and at the same time the admixture of CO product gas and/or of H$_2$ product gas to the heating gas mixture becomes possible, as it is explained in Tables 4, 5, 6 and 7.

The recirculation of the gas rich in methane to the feed gas mixture can be effected in conjunction with the recirculation of the carbon dioxide separated from the raw synthesis gas or independent thereof. In these recirculations measures of pressure increase generally are provided, such as e.g. compressors. The carbon dioxide separated from the raw synthesis gas normally is obtained at ambient pressure or at a pressure of up to about 3 bar. The stream rich in methane can be discharged from the cryogenic distillation process with a pressure comparable to the carbon dioxide, but possibly also under pressure. In the latter case, it can then be introduced directly into the feed gas or it requires an only small pressure increase as compared to the carbon dioxide, which can also be executed together with the carbon dioxide, in e.g. one or more common last pressure boosting stages of a carbon dioxide compressor.

The carbon dioxide preferably is admixed to the feed gas after a possible prereformation unit (prereforming), while the admixture of the methane-containing gas can be chosen freely. Since the methane-containing gas contains no sulfur, if it is permanently admixed to the feed gas, the desulfurization unit of the steam reforming plant can be reduced in size correspondingly. If the methane-containing gas is admixed to the feed gas with the carbon dioxide after a possible prereformer, steam must also be added to the feed gas mixture in this region of the plant, in order to establish a required S/C ratio in the feed gas mixture.

As shown in Table 4, the quantity of waste gases (off-gases) from the cryogenic distillation process for the CO purification (coldbox, CB) corresponds to approximately 25% to 50% of the total quantity of heating gas. These offgases comprise a methane-containing gas (CH$_4$) and a flashgas (FG) rich in $H_2$. In plants with a nitrogen removal in the cryogenic distillation plant there is also obtained a nitrogen-containing offgas which normally, however, has no significant share in the energy content of the heating gas mixture. The offgas of the pressure swing adsorption (PSA) has a share of about 20% to 35% in the total heating gas. The air preheating temperature above all influences the steam export quantity.

By recirculating the gas rich in methane from the cryogenic distillation plant to the feed gas, and by also reducing the external heating gas quantity as required, it is possible to admix a large amount of gas rich in hydrogen to the heating gas mixture and thus reduce the $H_2/CO$ molar ratio of the $H_2$ and CO product streams to a high extent, without the feed parameters being changed or plant sections being overdimensioned. This is shown in Tables 5, 6 and 7.

TABLE 4

Heating gas distribution of synthesis gas plants (derived cases F from Tables 1 to 3) for an air preheating temperature of 340° C. and a steam export at 30 barg and 300° C.

| | | Case | | | | |
|---|---|---|---|---|---|---|
| | | F | F2 | F2-I | F2-II | F2-III |
| Air preheating temperature | ° C. | 340 | 340 | 340 | 340 | 340 |
| Steam export quantity | t/h | 14.2 | 10.8 | 9.4 | 7.7 | 3.5 |
| Total heating gas quantity | Gcal/h | 58.9 | 48.39 | 44.74 | 41.14 | 34.22 |
| PSA residual gas content | % | 33.1 | 29.52 | 27.93 | 25.95 | 20.82 |
| CB $CH_4$ content | % | 41.8 | 35.00 | 31.64 | 27.44 | 17.00 |
| CB FG content | % | 7.0 | 6.32 | 6.02 | 5.65 | 4.69 |
| External heating gas content | % | 18.1 | 29.17 | 34.41 | 40.96 | 57.50 |

TABLE 5

Heating gas distribution of synthesis gas plants (derived case F of Table 1) for an air preheating temperature of 450° C. and a steam export at 30 barg and 300° C. - Influence of the admixture of gas rich in hydrogen to the heating gas mixture on the $H_2/CO$ product ratio for plants without carbon dioxide recirculation and without use of externally obtained carbon dioxide

| Case | | F | F with $CH_4$ recirculation into the feed gas | F with $CH_4$ recirculation into the feed gas and gas rich in hydrogen into heating gas |
|---|---|---|---|---|
| Air preheating temperature | ° C. | 450 | 450 | 450 |
| Feed gas stream | $Nm^3/h$ | 16850 | 14266 | 14266 |
| $H_2$ product stream | $Nm^3/h$ | 36250 | 36250 | 26250 |
| CO product stream | $Nm^3/h$ | 10000 | 10000 | 10000 |
| Steam export quantity | t/h | 8.9 | 9.5 | 8.1 |
| Total heating gas quantity | Gcal/h | 55.26 | 55.58 | 54.59 |
| PSA residual gas content | % | 35.28 | 35.08 | 35.72 |
| CB $CH_4$ content | % | 44.57 | 4.42 | 4.50 |
| CB FG content | % | 7.45 | 7.41 | 7.54 |
| External heating gas content | % | 12.69 | 53.09 | 5.01 |
| Gas rich in hydrogen | % | 0.00 | 0.00 | 47.23 |

TABLE 6

Heating gas distribution of synthesis gas plants (derived case F2 of Table 2) for an air preheating temperature of 340° C. and a steam export at 30 barg and 300° C. - Influence of the admixture of gas rich in hydrogen to the heating gas mixture on the $H_2/CO$ product ratio for plants with recirculation of the carbon dioxide separated from the synthesis gas into the feed gas and without use of externally obtained carbon dioxide

| Case | | F2 | F2 with $CH_4$ recirculation into the feed gas | F2 with $CH_4$ recirculation into the feed gas and gas rich in hydrogen into heating gas |
|---|---|---|---|---|
| Air preheating temperature | ° C. | 340 | 340 | 340 |
| Feed gas stream | $Nm^3/h$ | 12910 | 11136 | 11136 |
| $H_2$ product stream | $Nm^3/h$ | 26715 | 26715 | 16715 |
| CO product stream | $Nm^3/h$ | 10000 | 10000 | 10000 |
| Steam export quantity | t/h | 10.8 | 11.2 | 9.3 |
| Total heating gas quantity | Gcal/h | 48.39 | 48.55 | 47.25 |
| PSA residual gas content | % | 29.52 | 29.42 | 30.23 |
| CB $CH_4$ content | % | 35.00 | 3.49 | 3.49 |
| CB FG content | % | 6.32 | 6.30 | 6.30 |
| External heating gas content | % | 29.17 | 60.79 | 5.02 |
| Gas rich in hydrogen | % | 0.00 | 0.00 | 53.10 |

TABLE 7

Heating gas distribution of synthesis gas plants (derived case F2-II of Table 3) for an air preheating temperature of 340° C. and a steam export at 30 barg and 300° C. - Influence of the admixture of gas rich in hydrogen to the heating gas mixture on the $H_2$/CO product ratio for plants with recirculation of the carbon dioxide separated from the synthesis gas into the feed gas and with use of 2000 $Nm^3$/h of externally obtained carbon dioxide

| Case | | F2-II | F2-II with $CH_4$ recirculation into the feed gas | F2-II with $CH_4$ recirculation into the feed gas and gas rich in hydrogen into heating gas |
|---|---|---|---|---|
| Air preheating temperature | ° C. | 340 | 340 | 340 |
| Feed gas stream | $Nm^3$/h | 10175 | 8990 | 8990 |
| $H_2$ product stream | $Nm^3$/h | 20205 | 20205 | 10950 |
| CO product stream | $Nm^3$/h | 10000 | 10000 | 10000 |
| Steam export quantity | t/h | 7.7 | 8.1 | 6.5 |
| Total heating gas quantity | Gcal/h | 41.14 | 41.30 | 39.99 |
| PSA residual gas content | % | 25.95 | 25.84 | 26.69 |
| CB $CH_4$ content | % | 27.44 | 2.73 | 2.82 |
| CB FG content | % | 5.65 | 5.63 | 5.81 |
| External heating gas content | % | 40.96 | 65.79 | 5.01 |
| Gas rich in hydrogen | % | 0.00 | 0.00 | 59.66 |

Tables 5, 6 and 7 are based on recirculation rates of 90% of the methane-containing stream separated by cryogenic distillation into the feed gas mixture. This allows to keep the methane-containing stream recirculated into the feed gas constant independent of fluctuations. For compensation, the external heating gas quantity is varied. The same is preset to about 5%, which allows to compensate fluctuations in parts of the heating gas quantity and at the same time in the case of the loss of a heating gas quantity (e.g. by sudden shut-down of the pressure swing plant due to a valve malfunction) allows to compensate the required amount of heating gas by rapid increase of the external heating gas quantity, so that the steam reforming plant can be operated further.

Except for the reduction of the $H_2$/CO product ratio by feeding hydrogen-containing gas into the heating gas mixture, this ratio can also be increased temporarily by feeding CO product gas into the heating gas mixture. This is the case in particular when e.g. in a CO pipeline system (CO complex) a CO consumer suddenly fails and the combustion of excess CO in a flare system should then be avoided, until the steam reforming plant has been run down to the current need of CO or until the failed CO consumer again withdraws CO from the CO complex. During scheduled maintenance work on a CO consumer, the discharged amount of CO also can be reduced without having to change the operating point of the synthesis gas plant. The description of the above cases, which lead to the feeding of CO product gas into the heating gas mixture and hence to an increase of the $H_2$/CO product ratio, also are possible for the feeding of gas rich in hydrogen or $H_2$ product gas, so that for example upon loss of a $H_2$ consumer excess $H_2$ is passed to the heating gas mixture.

The temporary feeding of CO or $H_2$ into the heating gas mixture also is advantageous when the run-up rate (from a defined plant operating point, which at least corresponds to the minimum operating point of the plant—which normally corresponds to between 20% and 40% of the design quantity of a product stream—to another plant operating point with higher product stream) of a CO or $H_2$ consumer is higher than the run-up rate of the entire steam reforming plant including the CO and/or $H_2$ purification plant. Typical values lie in the range from 0.1%/min to maximally 2%/min or preferably in the range from 0.2%/min to 1%/min, based on the design point of a product stream. A design for 10000 $Nm^3$/h of CO product stream for example corresponds to a run-up rate of 1%/min of a load increase of 100 $Nm^3$ of CO per minute. In this case, a part of the product gas can be admixed to the heating gas mixture. The same problem does exist when, for example due to the loss of a consumer, the quantity of the product streams must be reduced.

INDUSTRIAL APPLICABILITY

The invention provides a process and a plant in which the $H_2$/CO molar ratio can be changed beyond the limits known from the prior art or beyond the plant design. The production hence can even further be adapted to the demand of the gas consumers. Furthermore, temporally fluctuating operating conditions within the plant complex or fluctuating demands of the consumers withdrawing $H_2$ or CO within this complex, can be satisfied without having to leave the previously fixed operating point of the reformer plant.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

LIST OF REFERENCE NUMERALS 1 feed gas mixture
2 heating gas mixture
3 reformer
4 raw synthesis gas
5 plant for separating carbon dioxide
6 carbon dioxide
7 raw synthesis gas, free from carbon dioxide
8 plant for fractionating raw synthesis gas
9 gas rich in hydrogen
10 gas rich in carbon monoxide (CO product gas)
11 gas rich in methane to the heating gas mixture
11a gas rich in methane to the feed gas mixture
12 pressure swing adsorption plant
13 gaseous impurities
14 gas rich in hydrogen, purified ($H_2$ product gas)
15 externally obtained carbon dioxide
16 gas rich in carbon monoxide to the heating gas mixture
17 gas rich in hydrogen after purification
18 gas rich in hydrogen before purification
19 raw synthesis gas to the CO shift stage
20 CO shift stage
21 shifted synthesis gas for hydrogen purification

The invention claimed is:

1. A process for the continuous conversion of a hydrocarbonaceous feed gas into a synthesis gas comprising carbon monoxide and hydrogen, comprising the following process steps carried out one after the other:

a) providing a feed gas mixture which comprises hydrocarbonaceous gas and steam, as well as a heating gas mixture which comprises a fuel gas and an oxygen-rich gas;

b) splitting the feed gas mixture under reforming conditions by catalytic steam reformation in a tubular reformer fired by burners into a raw synthesis gas containing hydrogen, carbon monoxide, carbon dioxide and methane, wherein heat necessary for splitting, which is indirectly transmitted to the feed gas mixture, is produced by combustion of the heating gas mixture, wherein in normal operation of the process a base $H_2/CO$ ratio ($V_B$) is obtained, c) separating the carbon dioxide from the raw synthesis gas;

d) fractionating the raw synthesis gas into a hydrogen-rich gas, a carbon monoxide-rich gas and a methane-rich gas, wherein the hydrogen-rich gas optionally is supplied to a further cleaning step and otherwise is discharged from the process as $H_2$ product gas, and the carbon monoxide-rich gas is supplied to the further use outside the process as CO product gas;

e) optionally cleaning of the hydrogen-rich gas by separating gaseous impurities and admixing the same to the heating gas mixture and discharging the cleaned hydrogen-rich gas as $H_2$ product gas for the further use outside the process;

f) admixing at least a part of the methane-rich gas obtained according to step d) to the feed gas mixture; and g) controlling the mass flows of first gases to be admixed with the feed gas mixture and second gases to be admixed with the heating gas mixture, wherein the process is carried out for the purpose of setting a target value V1 of the H2/CO ratio according to a first mode of operation or a second mode of operation, wherein the first mode of operation is selected when the target value V1 is less than the base ratio VB, wherein the second mode of operation is selected when the target value V1 is greater than the base ratio VB, wherein the step of controlling the mass flows comprises increasing the flow rate of the first gases admixed with the feed gas mixture during the first mode of operation, and wherein the step of controlling the mass flows comprises increasing the flow rate of the second gases admixed with the heating gas mixture during the second mode of operation, wherein the first gases to be admixed with the feed gas mixture comprise at least a part of the $H_2$ product gas and/or a fraction of the hydrogen-rich gas, wherein the second gases to be admixed with the heating gas mixture comprise at least a part of the CO product gas and/or a fraction of the carbon monoxide-rich gas.

* * * * *